(12) United States Patent
Wilson et al.

(10) Patent No.: US 10,633,117 B2
(45) Date of Patent: Apr. 28, 2020

(54) ALIGNMENT SYSTEMS AND METHODS FOR MOVING FUSELAGE STRUCTURES OF AN AEROSPACE VEHICLE INTO ASSEMBLY ALIGNMENT

(71) Applicant: The Boeing Company, Chicago, IL (US)

(72) Inventors: Jake A. Wilson, Charleston, SC (US); Craig A. Charlton, Charleston, SC (US); Andrew M. Huckey, Charleston, SC (US); Mark E. Nestleroad, Charleston, SC (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 15/723,471

(22) Filed: Oct. 3, 2017

(65) Prior Publication Data

US 2019/0100333 A1     Apr. 4, 2019

(51) Int. Cl.
| | |
|---|---|
| *B64F 1/36* | (2017.01) |
| *B64F 5/10* | (2017.01) |
| *B64C 1/06* | (2006.01) |
| *B23P 19/10* | (2006.01) |
| *B25J 13/08* | (2006.01) |
| *B23P 21/00* | (2006.01) |
| *B25J 9/08* | (2006.01) |
| *G01C 25/00* | (2006.01) |

(52) U.S. Cl.
CPC .............. *B64F 5/10* (2017.01); *B23P 19/102* (2013.01); *B25J 13/081* (2013.01); *B64C 1/068* (2013.01); *B23P 21/00* (2013.01); *B25J 9/08* (2013.01); *G01C 25/005* (2013.01); *G05B 2219/31068* (2013.01)

(58) Field of Classification Search
CPC ........................................................ B64F 5/10
USPC ............................................................ 356/72
See application file for complete search history.

(56) References Cited

U.S. PATENT DOCUMENTS

| | | | |
|---|---|---|---|
| 3,816,935 A | 6/1974 | Wilmot | |
| 4,185,799 A | 1/1980 | Richards, Jr. | |
| 5,742,385 A | 4/1998 | Champa | |
| 6,023,337 A * | 2/2000 | Schiff | .................. G01B 11/272 |
| | | | 356/400 |
| 8,005,563 B2 | 8/2011 | Cobb et al. | |
| | (Continued) | | |

*Primary Examiner* — Tarifur R Chowdhury
*Assistant Examiner* — Omar H Nixon
(74) *Attorney, Agent, or Firm* — Walters & Wasylyna LLC

(57) ABSTRACT

A system for moving first and second fuselage structures into assembly alignment, the system including a first transmitter indexed to a first seat track of the first fuselage structure, a first reflector target indexed to a first seat track of the second fuselage structure, a second transmitter indexed to a second seat track of the first fuselage structure, a second reflector target indexed to a second seat track of the second fuselage structure, wherein the first and second transmitters and the first and second reflector targets cooperate to provide first and second measurements indicative of position of the first fuselage structure relative to the second fuselage structure, and a manipulator system including at least one assembly actuator coupled to the first fuselage structure to move the first fuselage structure into assembly alignment with the second fuselage structure based upon the first and second measurements.

24 Claims, 8 Drawing Sheets

(56) References Cited

U.S. PATENT DOCUMENTS

| | | | |
|---|---|---|---|
| 2007/0138340 A1* | 6/2007 | Arafat | B64C 3/28 244/121 |
| 2009/0106988 A1* | 4/2009 | Cobb | B64F 5/10 33/1 BB |
| 2009/0112349 A1* | 4/2009 | Cobb | B64F 5/10 700/114 |
| 2010/0049354 A1* | 2/2010 | Stark | G01S 17/87 700/110 |
| 2011/0282483 A1 | 11/2011 | Simonetti et al. | |
| 2012/0292436 A1* | 11/2012 | Karem | B64C 3/56 244/49 |
| 2013/0265588 A1* | 10/2013 | Cooke | G01S 17/66 356/612 |
| 2015/0251775 A1* | 9/2015 | Durnad | B64C 1/061 244/131 |
| 2015/0316649 A1* | 11/2015 | Marsh | G01S 17/88 356/4.01 |
| 2016/0076879 A1* | 3/2016 | Hunt | G01B 11/24 356/601 |
| 2016/0304218 A1* | 10/2016 | Guering | B64C 1/18 |
| 2017/0015440 A1* | 1/2017 | Hunt | B21D 53/92 |
| 2017/0205800 A1* | 7/2017 | Regnault | G05B 19/402 |

* cited by examiner

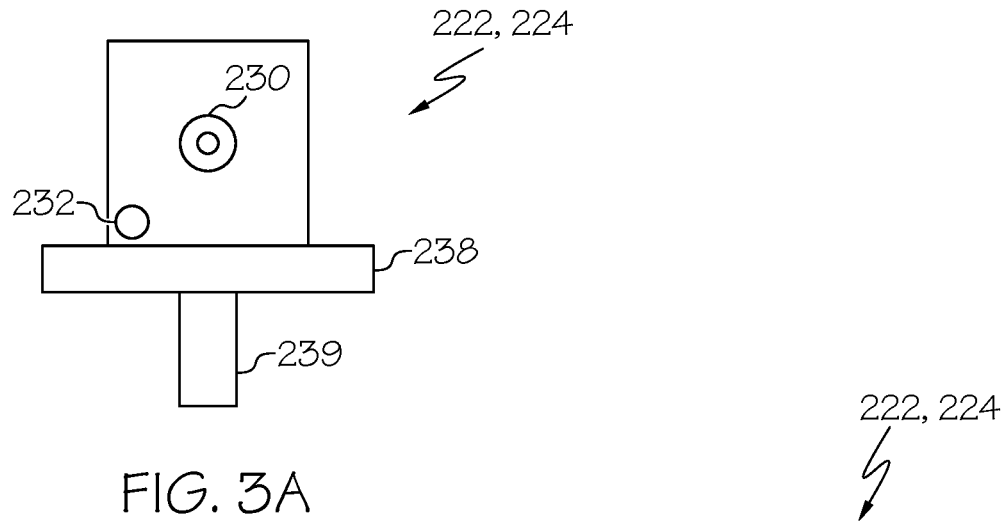
FIG. 3A
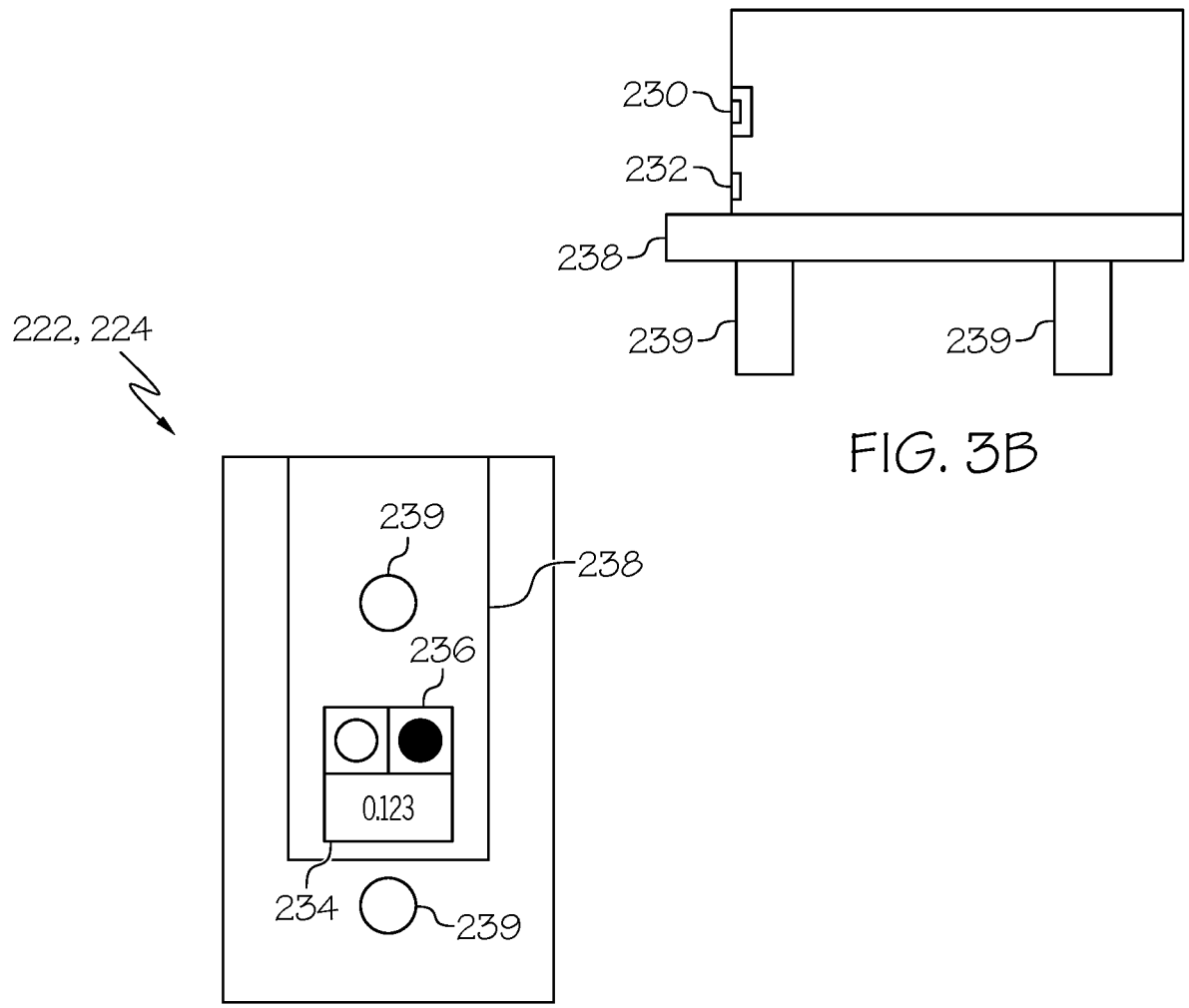
FIG. 3B
FIG. 3C

ALIGNMENT SYSTEMS AND METHODS FOR MOVING FUSELAGE STRUCTURES OF AN AEROSPACE VEHICLE INTO ASSEMBLY ALIGNMENT

FIELD

The present application relates to large manufacturing assemblies such as fuselage structures, and is particularly directed to alignment systems and methods for moving fuselage structures of an aerospace vehicle into assembly alignment.

BACKGROUND

A known alignment system and method for fuselage structures of an aerospace vehicle, such as an airplane, requires numerous separate measurements (e.g., up to 90 measurements) that are acquired using hand tools. The acquired measurements are recorded and uploaded to a database by hand. The acquired measurements are manipulated using trial and error methods to calculate distances that the fuselage structures need to be moved relative to each other to bring the fuselage structures into assembly alignment. The known alignment system and method is not only time-consuming but also labor-intensive requiring numerous human operators. It would be desirable to overcome drawbacks in known alignment systems and methods for large manufacturing assemblies such as fuselage structures of an airplane.

SUMMARY

In one aspect, a system is provided for moving a first fuselage structure and a second fuselage structure of an aerospace vehicle into assembly alignment. The system comprises a first transmitter coupled to the first fuselage structure and indexed to a first seat track of the first fuselage structure, and a first reflector target coupled to the second fuselage structure and indexed to a first seat track of the second fuselage structure. The first transmitter and the first reflector target cooperate to provide a first measurement indicative of position of the first fuselage structure relative to the second fuselage structure. The system further comprises a second transmitter coupled to the first fuselage structure and indexed to a second seat track of the first fuselage structure, and a second reflector target coupled to the second fuselage structure and indexed to a second seat track of the second fuselage structure. The second transmitter and the second reflector target cooperate to provide a second measurement indicative of position of the first fuselage structure relative to the second fuselage structure. The system further comprises a manipulator system including at least one assembly actuator coupled to the first fuselage structure to move the first fuselage structure into assembly alignment with the second fuselage structure based upon the first measurement provided by the first transmitter and the first reflector target and the second measurement provided by the second transmitter and the second reflector target.

In another aspect, a system is provided for moving a first fuselage structure and a second fuselage structure of an aerospace vehicle into assembly alignment. The system comprises a manipulator system including at least one assembly actuator for independently supporting and moving the first fuselage structure into assembly alignment with the second fuselage structure. The system also comprises a measurement system independent of the manipulator system for determining position of the first fuselage structure relative to the second fuselage structure while the first and second fuselage structures are supported on the manipulator system. Each of the first fuselage structure and the second fuselage structure includes a plurality of seat tracks assembled thereon. The seat tracks of the first fuselage structure and the second fuselage structure are longitudinally aligned when the first fuselage structure and second fuselage structure are aligned for coupling. The measurement system includes a first transmitter and a second transmitter arranged on the first fuselage structure. The first transmitter is indexed to a first seat track of the first fuselage structure and the second transmitter is indexed to a second seat track of the first fuselage structure. The system further comprises a first reflector target associated with the first transmitter and a second reflector target associated with the second transmitter. The first reflector target is indexed with a first seat track of the second fuselage structure and the second reflector target is indexed to a second seat track of the second fuselage structure. The first seat track of the first fuselage structure is aligned with the first seat track of the second fuselage structure and the second seat track of the first fuselage structure is aligned with the second seat track of the second fuselage structure when the first and second fuselage structures are aligned and coupled together.

In yet another aspect, a method is provided for moving a first fuselage structure and a second fuselage structure of an aerospace vehicle into assembly alignment. The method comprises coupling a first transmitter to the first fuselage structure such that the first transmitter is indexed to a first seat track of the first fuselage structure, and coupling a first reflector target to the second fuselage structure such that the first reflector target is indexed to a first seat track of the second fuselage structure and cooperates with the first transmitter to provide measurements indicative of positions of the first fuselage structure relative to the second fuselage structure. The method further comprises coupling a second transmitter to the first fuselage structure such that the second transmitter is indexed to a second seat track of the first fuselage structure, and coupling a second reflector target to the second fuselage structure such that the second reflector target is indexed to a second seat track of the second fuselage structure and cooperates with the second transmitter to provide measurements indicative of positions of the first fuselage structure relative to the second fuselage structure. The method further comprises coupling at least one assembly actuator to the first fuselage structure, and actuating the at least one assembly actuator to move the first fuselage structure into assembly alignment with the second fuselage structure based upon a first measurement provided by the first transmitter and the first reflector target and a second measurement provided by a second transmitter and the second reflector target.

In still another embodiment, a method is provided for moving a first fuselage structure and a second fuselage structure of an aerospace vehicle into an assembly alignment. The method comprises coupling a first assembly actuator to the first fuselage structure and coupling a second assembly actuator to the second fuselage structure. The method also comprises coupling a first transmitter and a second transmitter to the first fuselage structure. The first transmitter is indexed to a first seat track of the first fuselage structure and the second transmitter is indexed to a second seat track of the first fuselage structure. The method further comprises coupling a first reflector target associated with the first transmitter and a second reflector target associated with the second transmitter to the second fuselage structure. The first reflector target is indexed with a first seat track of the second fuselage structure and the second reflector target is indexed to a second seat track of the second fuselage structure. The first seat track of the first fuselage structure is aligned with the first seat track of the second fuselage structure and the second seat track of the first fuselage structure is aligned with the second seat track of the second fuselage structure when the first and second fuselage structures are aligned and coupled together. The method also comprises determining an initial position of the first fuselage structure relative to the second fuselage structure in response to measurements provided by a measurement system comprising the first and second transmitters and the first and second reflector targets. The method further comprises actuating the at least one assembly actuator based upon the measurements provided by the measurement system to change the position of the first fuselage structure relative to the second fuselage structure and thereby to move the first and second fuselage structures into assembly alignment.

Other aspects will become apparent from the following detailed description, the accompanying drawings and the appended claims.

BRIEF DESCRIPTION OF THE DRAWINGS

FIGS. 3A, 3B, and 3C are elevational views of a transmitter shown in FIG. 2.

DETAILED DESCRIPTION

The present application is directed to alignment systems and methods for moving fuselage structures of an aerospace vehicle into assembly alignment. The specific alignment system and method, and the industry in which the alignment system and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes alignment systems and methods for airplanes. More specifically, the disclosure below describes an alignment system for fuselage structures of an airplane. The alignment system and method of operating the alignment system may be implemented by an original equipment manufacturer (OEM) for assembling airplane fuselage structures in compliance with military and space regulations.

Figure 1:
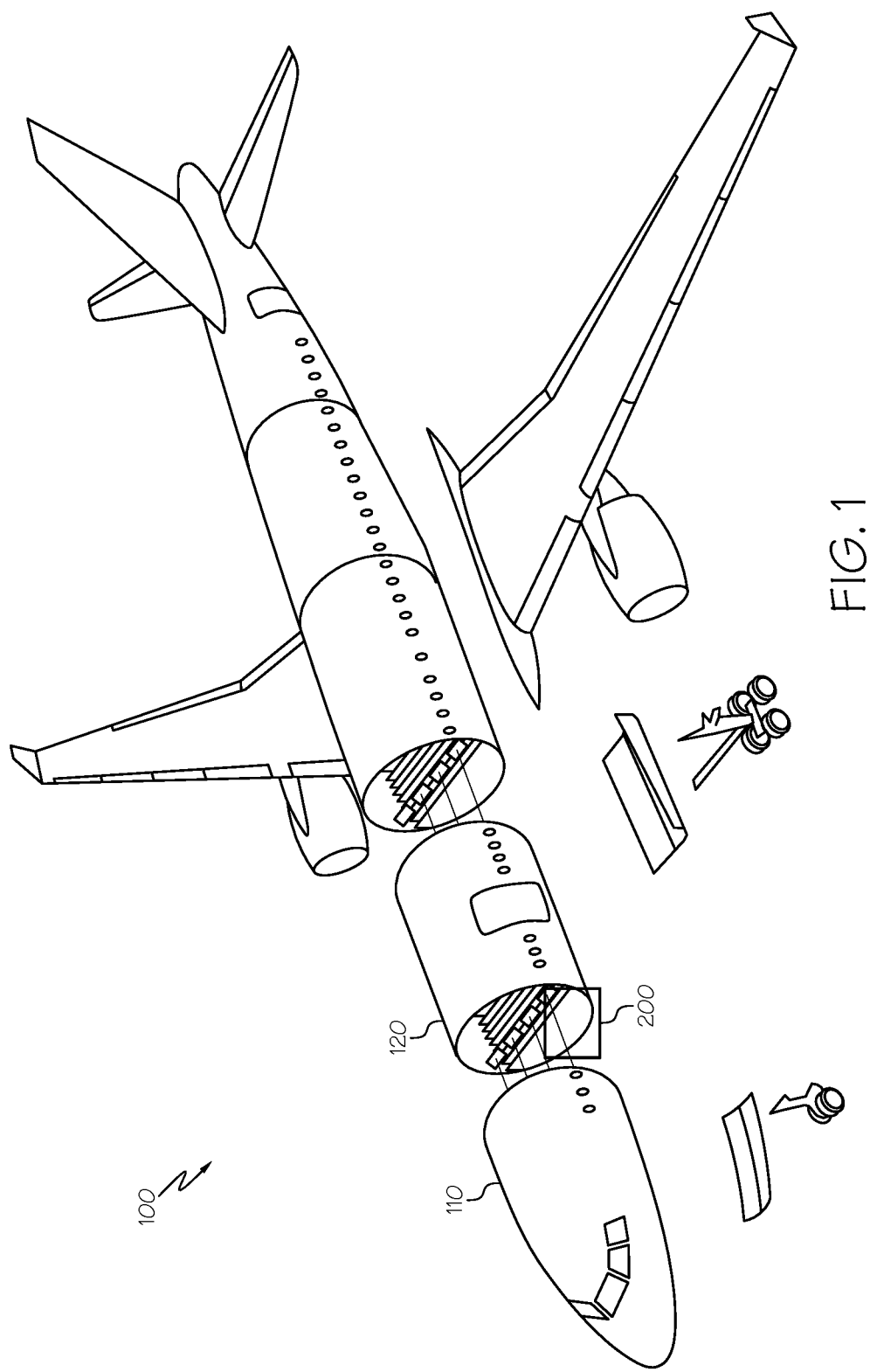
FIG. 1 is an exploded perspective view of an example aerospace vehicle implementing an alignment system in accordance with an embodiment.

Referring to FIG. 1, an exploded perspective view of an example aerospace vehicle 100 (e.g., an airplane) implementing an alignment system in accordance with an embodiment is illustrated. Airplane 100 includes a first fuselage structure 110 and a second fuselage structure 120 that is adjacent to the first fuselage structure 110. During manufacturing assembly of the airplane 100, the first fuselage structure 110 is moved into assembly alignment with the second fuselage structure 120 using an arrangement of a manipulator system that includes a number of assembly actuators and a measurement system that includes a number of transmitters and a corresponding number of reflector targets, as will be described herein. The first and second fuselage structures 110, 120 are in assembly alignment when the fuselage structures are in their final desired positions before the final mechanical connections, such as rivets, are completed.

Figure 2:
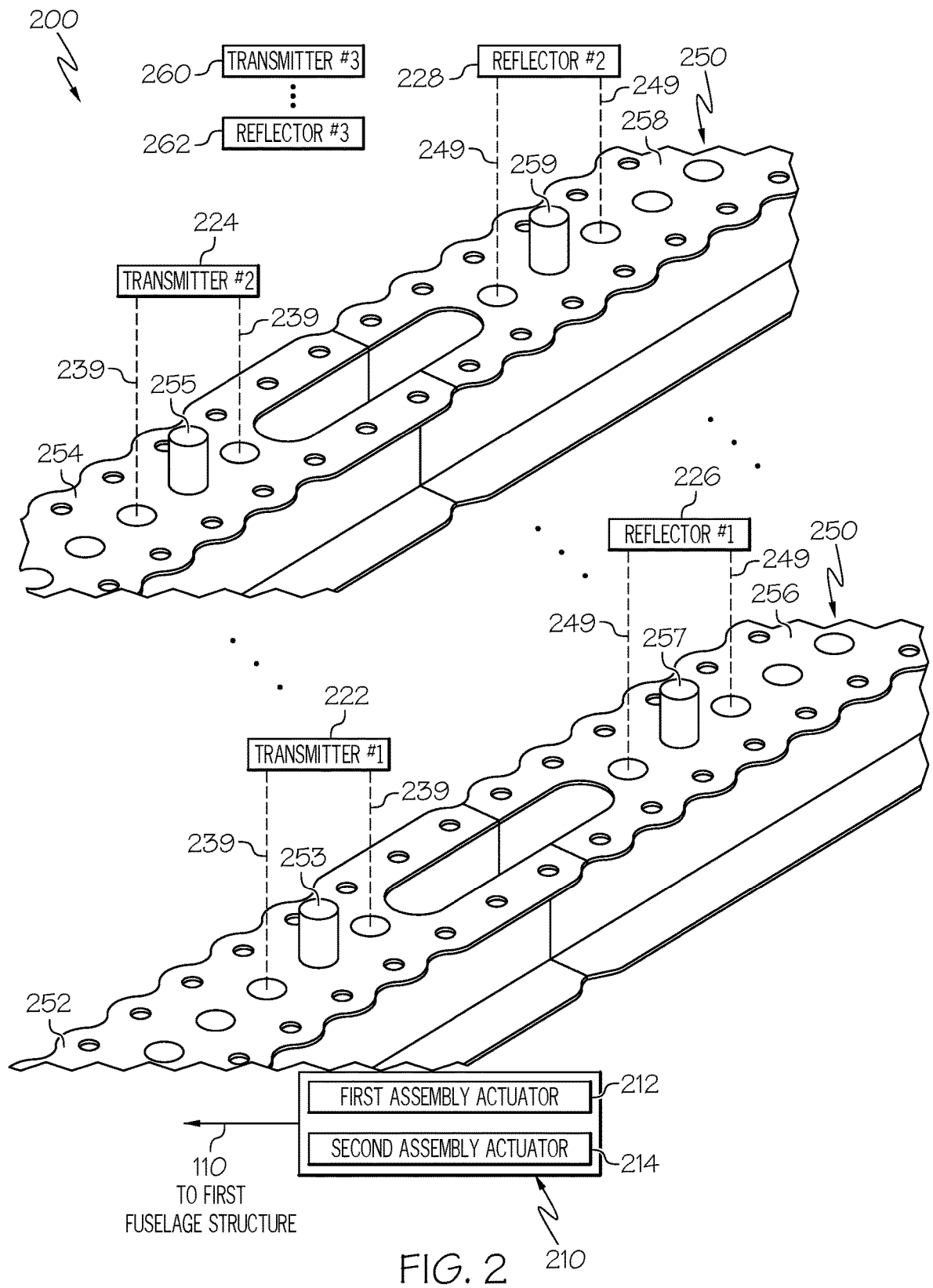
FIG. 2 is an enlarged view of a portion of FIG. 1, designated as a rectangle with reference numeral "200" in FIG. 1, and schematically shows a portion of an example alignment system including a number of transmitters and a number of reflector targets in accordance with an embodiment.

FIG. 2 is an enlarged view of a portion of FIG. 1, designated as a rectangle with reference numeral "200" in FIG. 1, and schematically shows a portion of an example alignment system. The example alignment system 200 includes a manipulator system 210 having at least one assembly actuator for independently supporting and moving the first fuselage structure 110 into assembly alignment with the second fuselage structure 120. In some embodiments, the manipulator system 210 includes a jacking system. In some embodiments, the manipulator system 210 includes a cable support system. In some embodiments, the manipulator system 210 includes a robotic system. Structure and operation of manipulator systems including assembly actuators are known and, therefore, will not be described.

In some embodiments, the at least one assembly actuator includes a first assembly actuator 212 and a second assembly actuator 214 coupled to the first fuselage structure 110. Although two assembly actuators are shown in the example implementation of FIG. 2, it is conceivable that any number of assembly actuators be used including one assembly actuator. As is known, the one or more assembly actuators move the first fuselage structure 110 in any combination of six degrees of freedom (i.e., x-axis, y-axis, z-axis, pitch, roll, and yaw) relative to the second fuselage structure 120. For simplicity and clarity of explanation, only the two actuators 212, 214 shown in FIG. 2 will be discussed herein.

The first and second assembly actuators 212, 214 cooperate to move the first fuselage structure 110 into assembly alignment with the second fuselage structure 120 based upon measurements provided by a measurement system 220. The measurement system 220 is independent of the manipulator system 210 and is provided for determining position of the first fuselage structure 110 relative to the second fuselage structure 120 while the first and second fuselage structures 110, 120 are supported on the first and second assembly actuators 212, 214.

As shown in FIG. 2, each of the first fuselage structure 110 and the second fuselage structure 120 includes a plurality of seat tracks 250 assembled thereon. The seat tracks 250 of the first fuselage structure 110 and the second fuselage structure 120 are longitudinally aligned when the first fuselage structure 110 and second fuselage structure 120 are aligned for coupling.

The measurement system 220 includes a number of transmitters and a corresponding number of reflector targets facing the transmitters. In the example implementation of FIG. 2, the measurement system 220 includes a first transmitter 222 and a second transmitter 224 arranged on the first fuselage structure 110. The first transmitter 222 is indexed (by way of index pins) to a first seat track 252 of the first fuselage structure 110 and the second transmitter 224 is indexed to a second seat track 254 of the first fuselage structure 110.

The measurement system 220 further includes a first reflector target 226 associated with the first transmitter 222 and a second reflector target 228 associated with the second transmitter 224. The first reflector target 226 is indexed (also by way of index pins) with a first seat track 256 of the second fuselage structure 120, and the second reflector target 228 is indexed to a second seat track 258 of the second fuselage structure 120. The first seat track 252 of the first fuselage structure 110 is aligned with the first seat track 256 of the second fuselage structure 120 and the second seat track 254 of the first fuselage structure 110 is aligned with the second seat track 258 of the second fuselage structure 120 when the first and second fuselage structures 110, 120 are aligned and coupled together.

Although two pairs of transmitters/reflector targets are shown in the example implementation of FIG. 2, it is conceivable that any plurality of pairs of transmitters/reflector targets be used. For example, optionally as shown in FIG. 2, a third transmitter 260 is indexed to another part of the first fuselage structure 110, and a third reflector target 262 is indexed to another part of the second fuselage structure 120. The part the first fuselage structure 110 to which the third transmitter 260 is indexed does not lie in the same plane as the first and second transmitters 222, 224. Also, the part the second fuselage structure 120 to which the third reflector target 262 is indexed does not lie in the same plane as the first and second reflector targets 226, 228. An example transmitter that can be used is the SICK brand line of transmitters commercially available from SICK AG with main headquarters located in Waldkirch, Germany and U.S. headquarters located in Minneapolis, Minn. Other transmitters from other sources are possible.

Figure 4A:
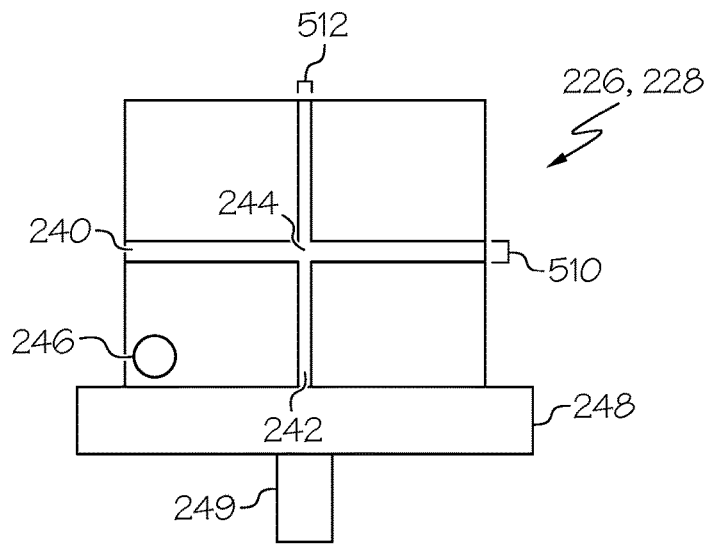
FIGS. 4A, 4B, and 4C are elevational views of a reflector target shown in FIG. 2.
Figure 4B:
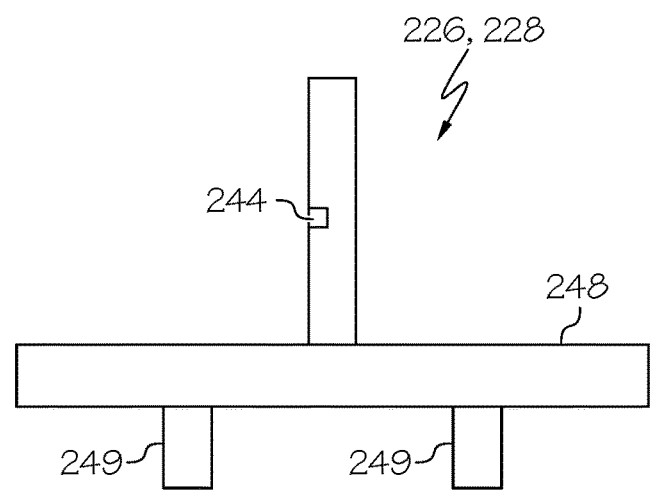
Figure 4C:
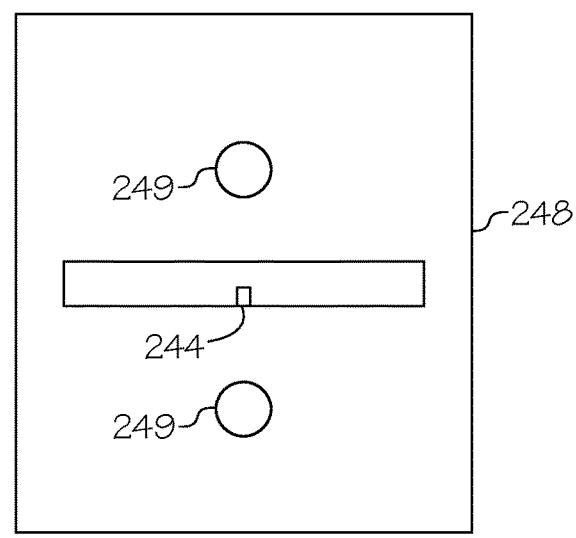

Referring to FIGS. 3A, 3B, and 3C, elevational views of a transmitter shown in FIG. 2 are illustrated. In particular, FIG. 3A is a front view, FIG. 3B is a side view, and FIG. 3C is a top view. Referring to FIGS. 4A, 4B, and 4C, elevational views of a reflector target shown in FIG. 2 are illustrated. In particular, FIG. 4A is a front view, FIG. 4B is a side view, and FIG. 4C is a top view. For simplicity and clarity of explanation, it is assumed that the construction of the first transmitter 222 and the construction of the second transmitter 224 are the same, and that the construction of the first reflector target 226 and the construction of the second reflector target 228 are the same.

As shown in FIGS. 3A, 3B, and 3C, each of the first and second transmitters 222, 224 includes an infrared range finder 232 for measuring distance between the first fuselage structure 110 and the second fuselage structure 120. More specifically, the infrared range finder 232 directs an infrared beam towards a range finder reflector 246 (FIG. 4A) of a reflector target, and the infrared range finder 232 measures the distance therebetween based upon the reflected infrared beam from the range finder reflector 246. Each of the first and second transmitters 222, 224 also includes a laser designator 230 that directs a laser beam towards the corresponding reflector target.

Each of the first and second transmitters 222, 224 also includes a range finder display 234 and a pair of GO/NO-GO light emitting diodes 236 for the distance that is being displayed on the range finder display 234. Each of the first and second transmitters 222, 224 further includes a base 238 attached to index pins 239 that can be inserted and secured in holes in a seat track of the first fuselage structure 110 or the second fuselage structure 120 (FIG. 2). More specifically, as shown in FIG. 2, the index pins 239 of the first transmitter 222 can be inserted and secured in holes that are adjacent to a guide pin 253 of the first seat track 252 of the first fuselage structure 110. Similarly, the index pins 239 of the second transmitter 224 can be inserted and secured in holes that are adjacent to a guide pin 255 of the second seat track 254 of the first fuselage structure 110.

As shown in FIGS. 4A, 4B, and 4C, each of the first and second reflector targets 226, 228 includes the range finder reflector 246. Each of the first and second reflector targets 226, 228 further includes a base 248 attached to index pins 249 that can be inserted and secured in holes in a seat track of the first fuselage structure 110 or the second fuselage structure 120 (FIG. 2). More specifically, as schematically shown as dashed lines in FIG. 2, the index pins 249 of the first reflector target 226 can be inserted and secured in holes that are adjacent to a guide pin 257 of the first seat track 256 of the second fuselage structure 120. Similarly, also as schematically shown as dashed lines in FIG. 2, the index pins 249 of the second reflector target 228 can be inserted and secured in holes that are adjacent to a guide pin 259 of the second seat track 258 of the second fuselage structure 120.

Each of the first and second reflector targets 226, 228 also includes target indicia representative of a buttline axis 242 (i.e., the y-axis direction) and a waterline axis 240 (i.e., the z-axis direction) of the first and second fuselage structures 110, 120. The target indicia includes a crosshair indicator 244 having reflective properties. The laser designator 230 of each of the first and second transmitters 222, 224 utilizes the target indicia from the corresponding reflector target to determine proper waterline and buttline axes alignment between the first and second fuselage structures 110, 120. It should be noted that the first and second fuselage structures 110, 120 have already been pre-aligned such that the laser beam from the laser designator 230 of each of the first and second transmitters 222, 224 is already on the target indicia of the corresponding reflector target, but not necessarily within the tolerance limits of the buttline axis 242 and the waterline axis 240. The first and second fuselage structures 110, 120 have also been pre-aligned such that the longitudinal distance between the first and second fuselage structures 110, 120 is close to but not necessarily within tolerance limits of the fuselage station. As is known, the waterline is associated with the z-axis (i.e., up/down) of the airplane, the buttline is associated with y-axis (i.e., left/right) of the airplane, and the fuselage station is associated with the x-axis (i.e., fore/aft) of the airplane.

Figure 5:
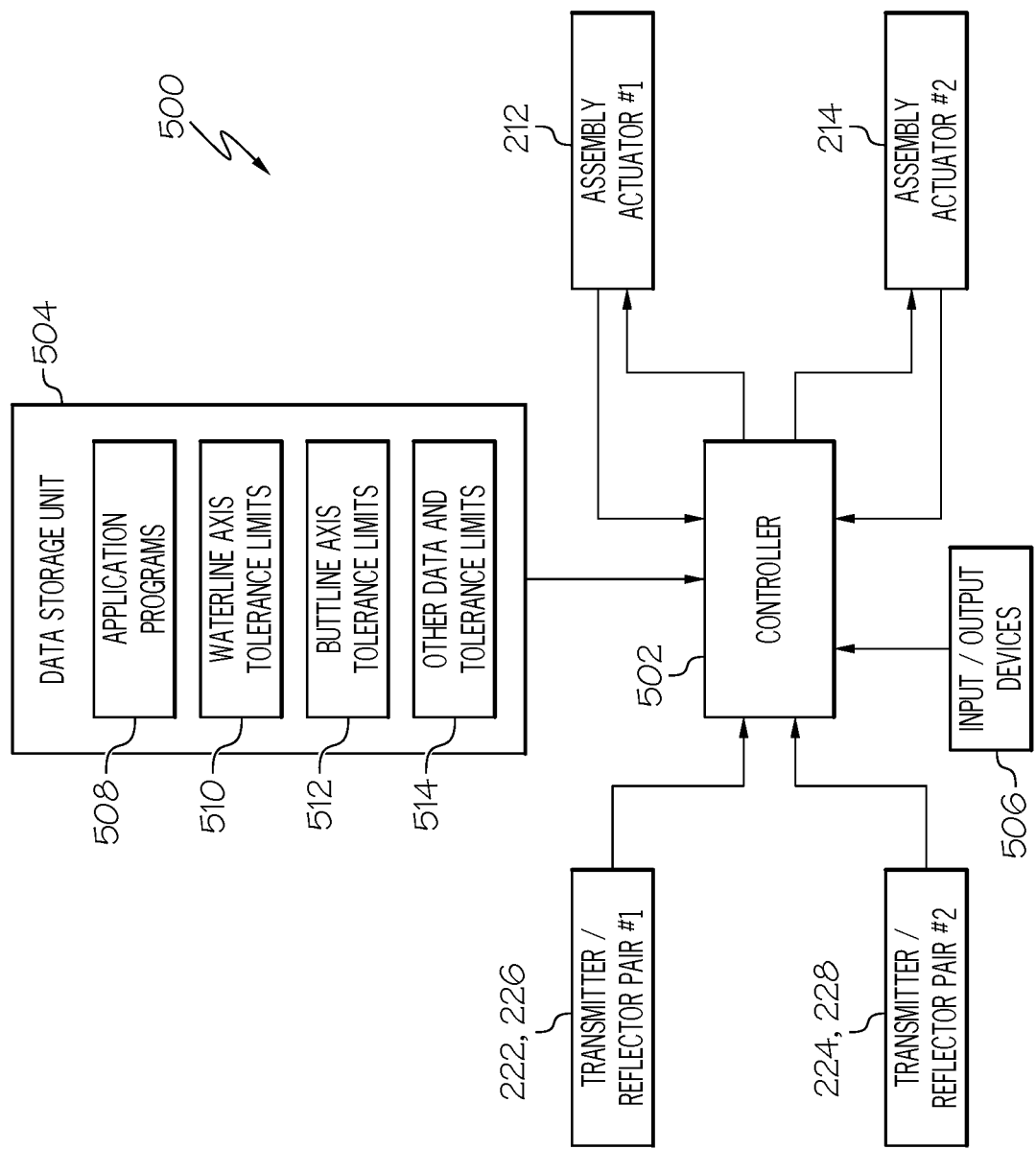
FIG. 5 shows an example computer system capable of controlling a number of assembly actuators in response to measurements acquired from the arrangement of transmitters and reflector targets of FIG. 2.

Referring to FIG. 5, an example computer system 500 capable of controlling the first and second assembly actuators 212, 214 in response to measurements acquired from the measurement system 220 comprising the transmitters 222, 224 and reflector targets 226, 228 of FIG. 2 is illustrated. More specifically, the computer system 500 includes a controller 502 that executes program instructions stored in a data storage unit 504, external data storage unit (not shown), or a combination thereof. The data storage unit 504 is configured to store one or more alignment application programs 508, one or more waterline axis tolerance limits 510, one or more buttline axis tolerance limits 512, and other data and tolerance limits 514 including fuselage station tolerance limits.

The controller 502 may comprise any type of technology. For example, the controller 502 may comprise a dedicated-purpose electronic processor. Other types of processors and processing unit technologies are possible. The data storage unit 504 may comprise any type of technology. For examples, data storage unit 504 may comprise random access memory (RAM), read only memory (ROM), solid state memory, or any combination thereof. Other types of memories and data storage unit technologies are possible. The computer system 500 further includes a number of input/output (I/O) devices 506 that may comprise any type of technology. For example, I/O devices 506 may comprise a keypad, a keyboard, a touch-sensitive display screen, a liquid crystal display (LCD) screen, a microphone, a speaker, or any combination thereof. Other types of I/O devices and technologies are possible.

The computer system 500 of FIG. 5 is responsive to measurements from the measurement system 220 (i.e., the transmitters 222, 224 and the reflector targets 226, 228) and determines the position of the first fuselage structure 110 relative to the second fuselage structure 120. The computer system 500 controls movements of the assembly actuators 212, 214 to bring the first fuselage structure 110 into assembly alignment with the second fuselage structure 120. The first transmitter 222 and the first reflector target 226 cooperate to provide a first measurement indicative of position of the first fuselage structure 110 relative to the second fuselage structure 120. Similarly, the second transmitter 224 and the second reflector target 228 cooperate to provide a second measurement indicative of position of the first fuselage structure 110 relative to the second fuselage structure 120. The assembly actuators 212, 214 are responsive to the first measurement and the second measurement to move the first fuselage structure 110 into assembly alignment with the second fuselage structure 120.

In some embodiments, measurements provided by the measurements system 220 is utilized by the controller 502 to send control signals to the manipulator system 210 to actuate one or both of the assembly actuators 212, 214 to change the position of the first fuselage structure 110 relative to the second fuselage structure 120. More specifically, the controller 502 is configured to execute instructions of the alignment application program 508 to provide control signals to the first and second assembly actuators 212, 214 to move the first and second fuselage structures 110, 120 into assembly alignment.

In particular, the controller 502 is configured to calculate an amount of movement of the first fuselage structure 110 relative to the second fuselage structure 120 based upon the waterline axis tolerance limits 510, the buttline axis tolerance limits 512, and the fuselage station limits 514. The controller 502 continues to calculate an amount of movement, and the first fuselage structure 110 moves based upon calculated amounts of movement. The first fuselage structure 110 continues to move relative to the second fuselage structure 120 until the laser beam from each of the first and second transmitters 222, 224 is within the waterline axis tolerance limits 510 and the buttline axis tolerance limits 512 (i.e., at the crosshair indicator 244) of the corresponding reflector target and the reading in the range finder display 234 of each of the first and second transmitters 222, 224 is within the fuselage tolerance limits 514.

In some embodiments, measurements provided by the measurement system 220 is utilized by an operator to actuate one or both of the assembly actuators 212, 214 to change the position of the first fuselage structure 110 relative to the second fuselage structure 120. More specifically, each of the first and second transmitters 222, 224 provides positioning information for determining the position of the first fuselage structure 110 relative to the second fuselage structure 120 to allow an operator to actuate the manipulator system 210 to bring the first fuselage structure 110 into assembly alignment with the second fuselage structure 120.

Figure 6:
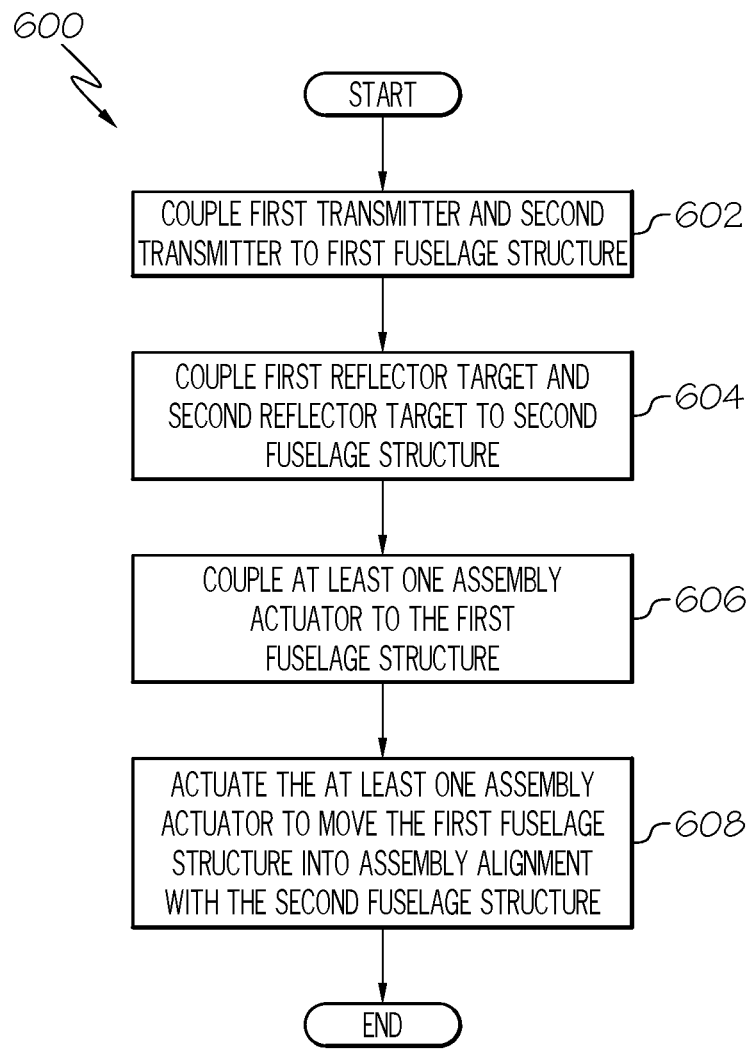
FIG. 6 is a flow diagram depicting an example method for operating the computer system of FIG. 5 to move fuselage structures of the aerospace vehicle of FIG. 1 into assembly alignment in accordance with an embodiment.

FIG. 6 is a flow diagram depicting an example method for operating the computer system 500 of FIG. 5 to move fuselage structures 110, 120 of the aerospace vehicle of FIG. 1 into assembly alignment in accordance with an embodiment. In block 602, the process comprises coupling the first and second transmitters 222, 224 to the first fuselage structure 110 such that the first transmitter 222 is indexed to the first seat track 252 of the first fuselage structure 110 and the second transmitter 224 is indexed to the second seat track 254 of the first fuselage structure 110. In block 604, the process comprises coupling the first and second reflector targets 226, 228 to the second fuselage structure 120 such that the first reflector target 226 is indexed to the first seat track 256 of the second fuselage structure 120 and the second reflector target 228 is indexed to the second seat track 258 of the second fuselage structure 120. The first and second reflector targets 226, 228 and the first and second transmitters 222, 224 cooperate together to provide measurements indicative of positions of the first fuselage structure 110 relative to the second fuselage structure 120. The process proceeds to block 606.

In block 606, the process comprises coupling at least one assembly actuator to the first fuselage structure 110. Then in block 608, the process comprises actuating the at least one assembly actuator to move the first fuselage structure 110 into assembly alignment with the second fuselage structure 120 based upon a first measurement provided by the first transmitter 222 and the first reflector target 226 and a second measurement provided by the second transmitter 224 and the second reflector target 228. The process then ends.

In some embodiments, coupling at least one assembly actuator to the first fuselage structure 110 includes coupling the first and second assembly actuators 212, 214 to the first fuselage structure 110.

In some embodiments, the process is performed by an electronic processor 502 having a memory executing one or more programs of instructions which are tangibly embodied in a program storage medium readable by the electronic processor 502.

Figure 7:
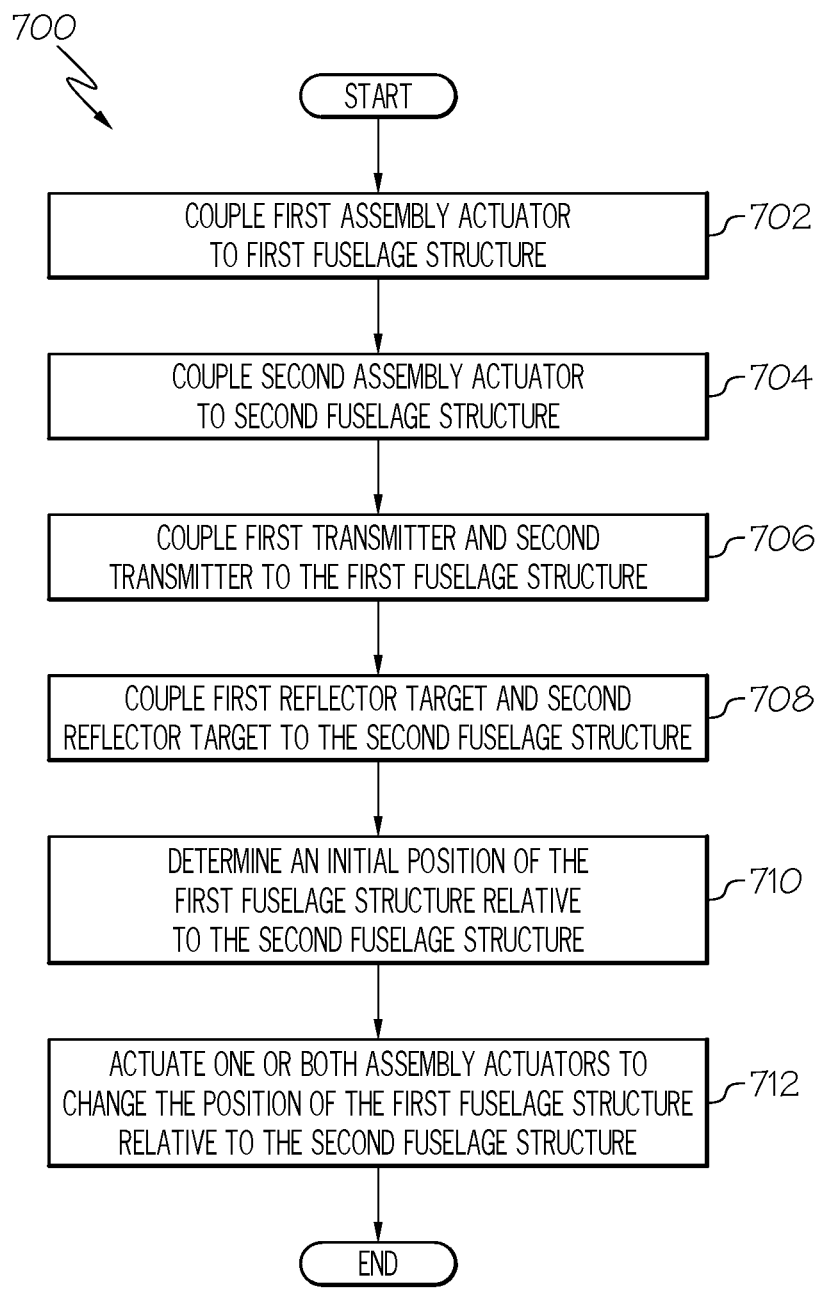
FIG. 7 is a flow diagram depicting an example method for operating the computer system of FIG. 5 to move fuselage structures of the aerospace vehicle of FIG. 1 into assembly alignment in accordance with another embodiment.

FIG. 7 is a flow diagram depicting an example method for operating the computer system 500 of FIG. 5 to move fuselage structures 110, 120 of the aerospace vehicle of FIG. 1 into assembly alignment in accordance with another embodiment. In block 702, the process comprises coupling the first assembly actuator 212 to the first fuselage structure 110. In block 704, the process comprises coupling the second assembly actuator 214 to the first fuselage structure 110. The process proceeds to block 706.

In block 706, the process comprises coupling the first transmitter 222 and the second transmitter 224 to the first fuselage structure 110. The first transmitter 222 is indexed to the first seat track 252 of the first fuselage structure 110, and the second transmitter 224 is indexed to the second seat track 254 of the first fuselage structure 110. In block 708, the process comprises coupling the first reflector target 226 associated with the first transmitter 222 and the second reflector target 228 associated with the second transmitter 224 to the second fuselage structure 120. The first reflector target 226 is indexed with the first seat track 256 of the second fuselage structure 120, and the second reflector target 228 is indexed to the second seat track 258 of the second fuselage structure 120. The first seat track 252 of the first fuselage structure 110 is aligned with the first seat track 256 of the second fuselage structure 120 and the second seat track 254 of the first fuselage structure 110 is aligned with the second seat track 258 of the second fuselage structure 120 when the first and second fuselage structures 110, 120 are aligned and coupled together. The process proceeds to block 710.

In block 710, the process comprises determining an initial position of the first fuselage structure 110 relative to the second fuselage structure 120 in response to measurements provided by the measurement system 220 comprising the first and second transmitters 222, 224 and the first and second reflector targets 226, 228. Then in block 712, the process comprises actuating one or both of the assembly actuators 212, 214 based upon the measurements provided by the measurement system 220 to change the position of the first fuselage structure 110 relative to the second fuselage structure 120 and thereby to move the first and second fuselage structures 110, 120 into assembly alignment.

In some embodiments, the process further comprises, after the position of the first fuselage structure 110 relative to the second fuselage structure 120 has been changed, determining if additional changing of the position of the first fuselage structure 110 relative to the second fuselage structure 120 is required to achieve a necessary assembly alignment between the first and second fuselage structures 110, 120.

In some embodiments, measurements provided by the measurements system 220 is utilized by the controller 502 of the computer system 500 associated with the measurement system 220 to send control signals to actuate one or both of the assembly actuators 212, 214 to change the position of the first fuselage structure 110 relative to the second fuselage structure 120.

In some embodiments, measurements provided by the measurement system 220 is utilized by an operator to actuate one or both of the assembly actuators 212, 214 to change the position of the first fuselage structure 110 relative to the second fuselage structure 120.

It should be apparent that fuselage structures that are aligned in accordance with the above-described example methods require less time and less labor to achieve. The result is a much quicker turnaround time of the manufacturing assembly process as compared to known alignment methods that require more time and more labor to achieve.

It should also be apparent that the above-described measurement system 220 continuously provides position measurements of the first fuselage structure 110 about all six degrees of freedom relative to the second fuselage structure 120. The continuously-provided position measurements can be used by the controller 502 to automatically (i.e., without any human intervention) to control one or both of the first and second assembly actuators 212, 214 to bring the first and second fuselage structures 110, 120 into final assembly alignment. Alternatively, or in addition to, the continuously-provided position measurements can be used by a human operator to manually bring the first and second fuselage structures 110, 120 into final assembly alignment. For example, the operator can manually input position measurements and commands into a hand-held electronic device, such as a manipulator pendant, while monitoring the pair of GO/NO-GO light emitting diodes 236 on each of the first and second transmitters 222, 224. The continuously-provided position measurements can be wirelessly transmitted to a database for retention and reporting purposes.

It should further be apparent that the accuracy and precision of the index pins 239 (FIG. 2) of the first and second transmitters 222, 224 and the accuracy and precision of the index pins 249 of the first and second reflector targets 226, 228 enable the measurement system 220 to operate with a minimum of only two pairs of transmitters and reflector targets as disclosed herein. It is conceivable though that any plurality of pairs of transmitters and reflector targets could be installed, depending upon the range of potential error and the acceptable tolerance for the particular application. For example, the number of pairs of transmitters and reflector targets could be up to ten.

Figure 8:
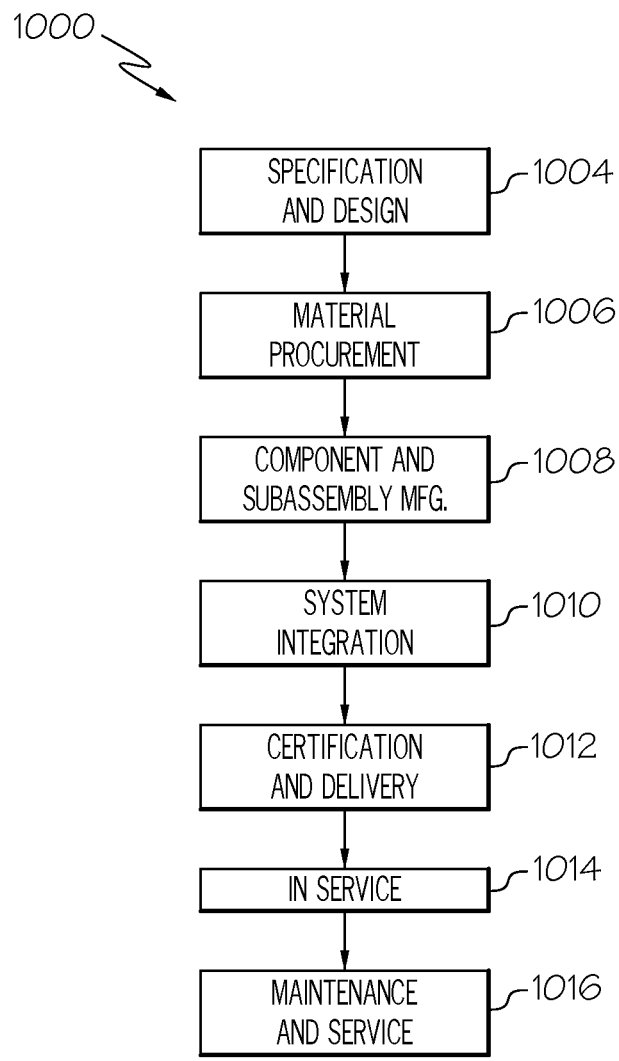
FIG. 8 is a flow diagram of an aircraft manufacturing and service methodology.
Figure 9:
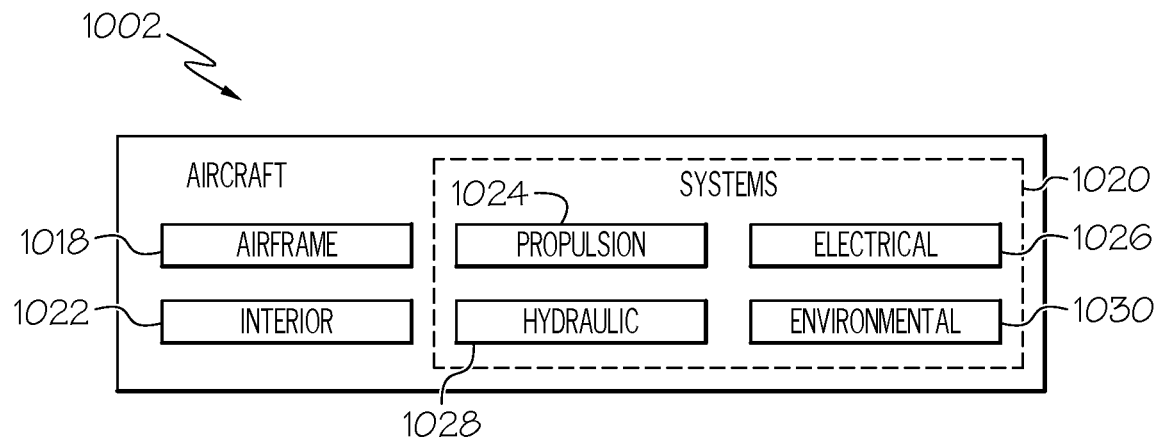
FIG. 9 is a block diagram of an aircraft.

Examples of the disclosure may be described in the context of an aircraft manufacturing and service method 1000, as shown in FIG. 8, and an aircraft 1002, as shown in FIG. 9. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed alignment systems and alignment methods may be employed during any one or more of the stages of the aircraft manufacturing and service method 1000. As one example, components or subassemblies corresponding to component/subassembly manufacturing 1008, system integration 1010, and/or maintenance and service 1016 may be assembled using the disclosed alignment systems and alignment methods. As another example, the airframe 1018 may be constructed using the disclosed alignment systems and alignment methods. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The above-described alignment systems and methods are described in the context of an aircraft. However, one of ordinary skill in the art will readily recognize that the disclosed alignment systems and methods are suitable for a variety of applications. For example, the disclosed alignment systems and methods may be implemented in various types of vehicles including, for example, helicopters, passenger ships, automobiles, marine products (boat, motors, etc.) and the like.

Although the above description describes a laser-based and infrared-based system to align fuselage structures of an aircraft, it is conceivable that an alignment system that is other than laser-based and other than infrared-based may be used.

Further, although the above-description describes alignment systems and methods for fuselage structures of an airplane in the aviation industry in accordance with military and space regulations, it is contemplated that the alignment systems and methods may be implemented to facilitate alignment for any type of large manufacturing assembly in any industry in accordance with the applicable industry standards. The specific alignment system and method can be selected and tailored depending upon the particular application.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Further, although various aspects of disclosed embodiments have been shown and described, modifications may occur to those skilled in the art upon reading the specification. The present application includes such modifications and is limited only by the scope of the claims.

What is claimed is:

1. A system for moving a first fuselage structure and a second fuselage structure of an aerospace vehicle into assembly alignment, the system comprising:
   a first transmitter coupled to the first fuselage structure and indexed to a first seat track of the first fuselage structure;
   a first reflector target coupled to the second fuselage structure and indexed to a first seat track of the second fuselage structure, wherein the first transmitter and the first reflector target cooperate to provide a first measurement indicative of position of the first fuselage structure relative to the second fuselage structure;
   a second transmitter coupled to the first fuselage structure and indexed to a second seat track of the first fuselage structure;
   a second reflector target coupled to the second fuselage structure and indexed to a second seat track of the second fuselage structure, wherein the second transmitter and the second reflector target cooperate to provide a second measurement indicative of position of the first fuselage structure relative to the second fuselage structure; and
   a manipulator system including at least one assembly actuator coupled to the first fuselage structure to move the first fuselage structure into assembly alignment with the second fuselage structure based upon the first measurement provided by the first transmitter and the first reflector target and the second measurement provided by the second transmitter and the second reflector target.

2. The system of claim 1 further comprising:
   a third transmitter coupled to the first fuselage structure and indexed to another part of the first fuselage structure; and
   a third reflector target coupled to the second fuselage structure and indexed to another part of the second fuselage structure, wherein the third transmitter and the third reflector target cooperate to provide a third measurement indicative of position of the first fuselage structure relative to the second fuselage structure.

3. The system of claim 2 wherein the manipulator system including the at least one assembly actuator is responsive to the first measurement, the second measurement, and the third measurement to move the first fuselage structure into assembly alignment with the second fuselage structure.

4. The system of claim 1 wherein the manipulator system including the at least one assembly actuator includes first and second assembly actuators coupled to the first fuselage structure.

5. The system of claim 1 further comprising:
   a data storage unit;
   an alignment application program stored on the data storage unit; and
   a controller configured to execute instructions of the alignment application program to provide control signals to the manipulator system including the at least one assembly actuator to move the first fuselage structure into assembly alignment with the second fuselage structure.

6. The system of claim 5 wherein (i) the data storage unit is further configured to store a waterline axis tolerance limit, a buttline axis tolerance limit, and a fuselage station tolerance limit, and (ii) the controller is further configured to calculate an amount of movement of the first fuselage structure relative to the second fuselage structure based upon the waterline axis tolerance limit, the buttline axis tolerance limit, and the fuselage station tolerance limit.

7. A system for moving a first fuselage structure and a second fuselage structure of an aerospace vehicle into assembly alignment, the system comprising:
   a manipulator system including at least one assembly actuator for independently supporting and moving the first fuselage structure into assembly alignment with the second fuselage structure; and
   a measurement system independent of the manipulator system for determining position of the first fuselage structure relative to the second fuselage structure while the first and second fuselage structures are supported on the manipulator system, wherein each of the first fuselage structure and the second fuselage structure includes a plurality of seat tracks assembled thereon, the seat tracks of the first fuselage structure and the second fuselage structure being longitudinally aligned when the first fuselage structure and second fuselage structure are aligned for coupling, the measurement system including:
   a first transmitter and a second transmitter arranged on the first fuselage structure, the first transmitter being indexed to a first seat track of the first fuselage structure and the second transmitter being indexed to a second seat track of the first fuselage structure; and a first reflector target associated with the first transmitter and a second reflector target associated with the second transmitter, the first reflector target being indexed with a first seat track of the second fuselage structure and the second reflector target being indexed to a second seat track of the second fuselage structure, wherein the first seat track of the first fuselage structure is aligned with the first seat track of the second fuselage structure and the second seat track of the first fuselage structure is aligned with the second seat track of the second fuselage structure when the first and second fuselage structures are aligned and coupled together.

8. The system of claim 7 wherein each of the first and second transmitters includes a laser designator.

9. The system of claim 8 wherein each of the first and second transmitters is associated with an infrared range finder for measuring distance between the first fuselage structure and the second fuselage structure.

10. The system of claim 7 further comprising:
a computer system responsive to measurements from the measurement system and for (i) determining the position of the first fuselage structure relative to the second fuselage structure, and (ii) controlling the manipulator system to bring the first fuselage structure into assembly alignment with the second fuselage structure.

11. The system of claim 7 wherein each of the first and second transmitters provides positioning information for determining the positions of the first fuselage structure relative to the second fuselage structure to allow an operator to actuate the manipulator system to bring the first fuselage structure into assembly alignment with the second fuselage structure.

12. The system of claim 11 wherein (i) each of the first and second reflector targets includes target indicia representative of a waterline axis and a buttline axis, and (ii) the laser designator of each of the first and second transmitters utilizes the target indicia to determine proper waterline and buttline axes alignment between the first and second fuselage structures.

13. The system of claim 12 wherein the target indicia includes a crosshair indicator having reflective properties.

14. The system of claim 7 wherein the manipulator system includes a jacking system.

15. The system of claim 7 wherein the manipulator system includes a cable support system.

16. The system of claim 7 wherein the manipulator system includes a robotic system.

17. A method for moving a first fuselage structure and a second fuselage structure of an aerospace vehicle into assembly alignment, the method comprising:
coupling a first transmitter to the first fuselage structure such that the first transmitter is indexed to a first seat track of the first fuselage structure;
coupling a first reflector target to the second fuselage structure such that the first reflector target is indexed to a first seat track of the second fuselage structure and cooperates with the first transmitter to provide measurements indicative of positions of the first fuselage structure relative to the second fuselage structure;
coupling a second transmitter to the first fuselage structure such that the second transmitter is indexed to a second seat track of the first fuselage structure;
coupling a second reflector target to the second fuselage structure such that the second reflector target is indexed to a second seat track of the second fuselage structure and cooperates with the second transmitter to provide measurements indicative of positions of the first fuselage structure relative to the second fuselage structure;
coupling at least one assembly actuator to the first fuselage structure; and
actuating the at least one assembly actuator to move the first fuselage structure into assembly alignment with the second fuselage structure based upon a first measurement provided by the first transmitter and the first reflector target and a second measurement provided by the second transmitter and the second reflector target.

18. The method of claim 17 further comprising:
coupling a third transmitter to the first fuselage structure such that the third transmitter is indexed to another part of the first fuselage structure; and
coupling a third reflector target to the second fuselage structure such that the third reflector target is indexed to another part of the second fuselage structure and cooperates with the third transmitter to provide measurements indicative of position of the first fuselage structure relative to the second fuselage structure.

19. The method of claim 17 wherein coupling at least one assembly actuator to the first and second fuselage structures includes:
coupling a first assembly actuator and a second assembly actuator to the first fuselage structure.

20. The method of claim 17 wherein the method is performed by an electronic processor having a memory executing one or more programs of instructions which are tangibly embodied in a program storage medium readable by the electronic processor.

21. A method for moving a first fuselage structure and a second fuselage structure of an aerospace vehicle into an assembly alignment, the method comprising:
coupling at least one actuator to the first fuselage structure;
coupling a first transmitter and a second transmitter to the first fuselage structure, the first transmitter being indexed to a first seat track of the first fuselage structure and the second transmitter being indexed to a second seat track of the first fuselage structure;
coupling a first reflector target associated with the first transmitter and a second reflector target associated with the second transmitter to the second fuselage structure, the first reflector target being indexed with a first seat track of the second fuselage structure and the second reflector target being indexed to a second seat track of the second fuselage structure, wherein the first seat track of the first fuselage structure is aligned with the first seat track of the second fuselage structure and the second seat track of the first fuselage structure is aligned with the second seat track of the second fuselage structure when the first and second fuselage structures are aligned and coupled together;
determining an initial position of the first fuselage structure relative to the second fuselage structure in response to measurements provided by a measurement system comprising the first and second transmitters and the first and second reflector targets; and
actuating the at least one assembly actuator based upon the measurements provided by the measurement system to change the position of the first fuselage structure relative to the second fuselage structure and thereby to move the first and second fuselage structures into assembly alignment.

22. The method of claim 21 further comprising:
after the position of the first fuselage structure relative to the second fuselage structure has been changed, determining if additional changing of the position of the first fuselage structure relative to the second fuselage structure is required to achieve a necessary assembly alignment between the first and second fuselage structures.

23. The method of claim 21 wherein measurements provided by the measurements system is utilized by a controller of a computer system associated with the measurement system to send control signals to actuate the at least one assembly actuators to change the position of the first fuselage structure relative to the second fuselage structure.

24. The method of claim 21 wherein measurements provided by the measurement system is utilized by an operator to actuate the at least one assembly actuators to change the position of the first fuselage structure relative to the second fuselage structure.

\* \* \* \* \*